United States Patent [19]
Lord et al.

[11] Patent Number: 5,100,019
[45] Date of Patent: Mar. 31, 1992

[54] FEED ASSEMBLY

[75] Inventors: Barry A. Lord; Parviz Khosravi, both of Gainesville, Ga.

[73] Assignee: Scovill Fasteners Inc., Clarkesville, Ga.

[21] Appl. No.: 660,395

[22] Filed: Feb. 25, 1991

[51] Int. Cl.$^5$ .................. B65B 57/20; B65G 43/10; B65G 47/64
[52] U.S. Cl. .................................. 221/7; 221/112; 221/114; 221/116; 198/451; 377/6
[58] Field of Search ............... 221/7, 112, 114, 116, 221/258; 198/451; 377/6

[56] References Cited

U.S. PATENT DOCUMENTS

| | | | |
|---|---|---|---|
| 4,033,477 | 7/1977 | Hoppe et al. | 221/114 |
| 4,171,065 | 10/1979 | Hurst | 221/7 |
| 4,251,008 | 2/1981 | Bruneau | 377/6 |
| 4,390,779 | 6/1983 | Heikel | 377/6 |
| 4,424,894 | 1/1984 | Fatt et al. | 198/451 |
| 4,462,517 | 7/1984 | Takata et al. | 198/451 |
| 4,618,053 | 10/1986 | Taga | 221/116 |
| 4,848,592 | 7/1989 | Shemeta | 221/258 |

Primary Examiner—John S. Heyman
Attorney, Agent, or Firm—Dallett Hoopes

[57] ABSTRACT

A pair of superposed inclined feed tracks have slots along their upper and lower walls respectively. Elongate gates with inturned tips are disposed along the tracks and pivoted intermediate their ends on pins. A yoke having an axis intermediate the two pins has outward parallel fingers which are disposed outward of the pins, and as the yoke is turned by a rotary solenoid, first in one direction and then the other, the fingers engage the gates on opposite sides of their pivot pins oppositely and alternately to alternately open and close the respective tracks. A reciprocating pusher pushes the parts into the working ends of the upper and lower dies and a settable counter counts the strokes of the pusher. A circuit causes activation of the solenoid to shift the gates to switch the feed from one feed track to the other track when the counter registers up to the set number of strokes.

6 Claims, 3 Drawing Sheets

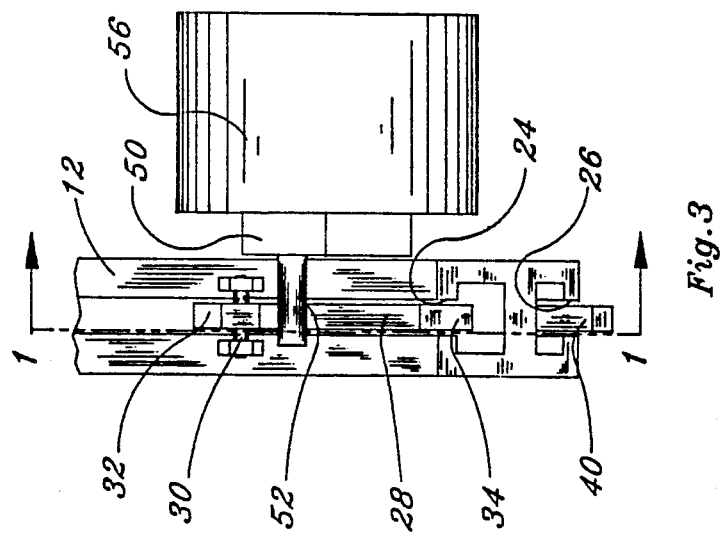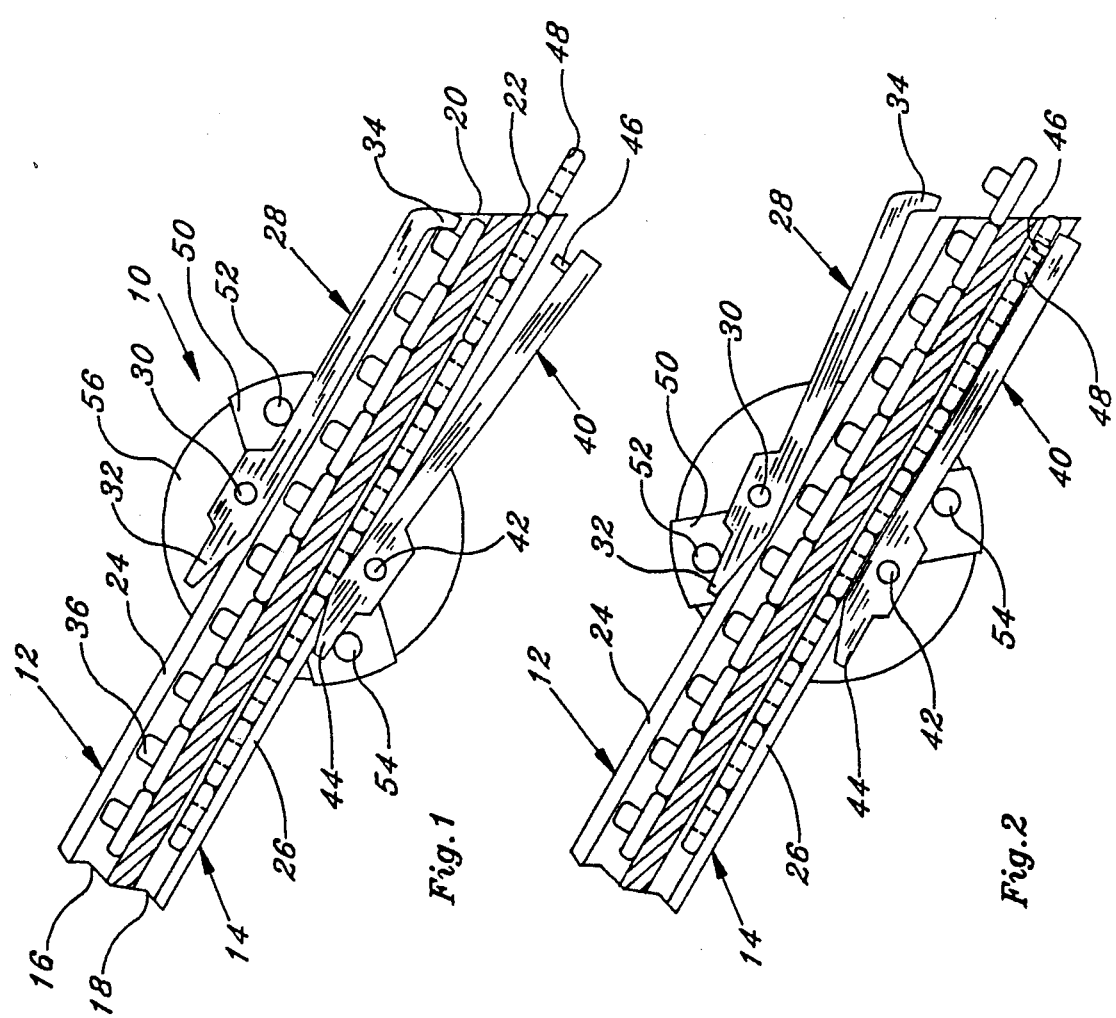

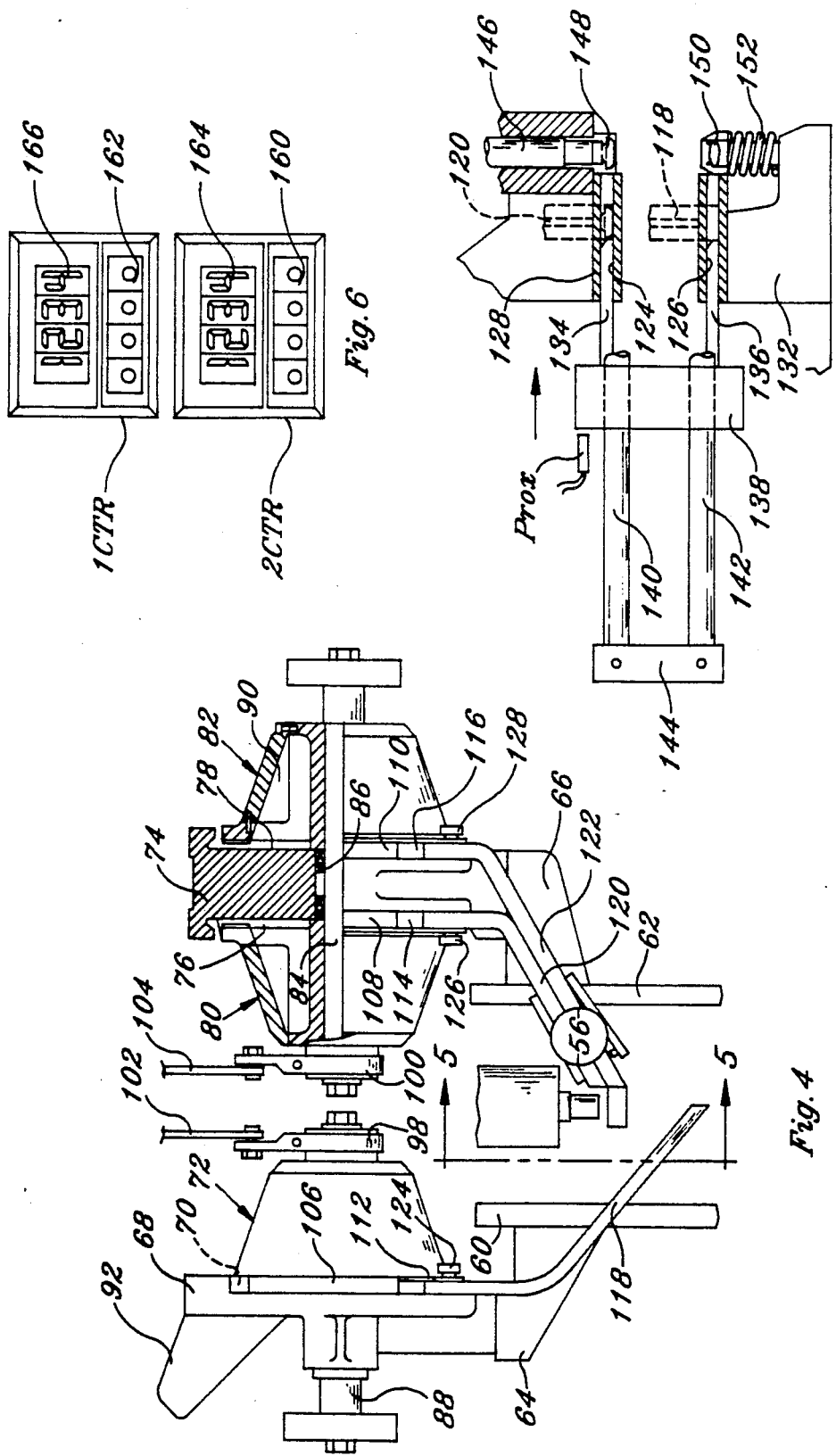

FEED ASSEMBLY

BACKGROUND OF THE INVENTION

1. Field of the Invention

This invention relates to a feed assembly for serially feeding set numbers of diverse small parts. More specifically, this invention relates to a programmable feeder for small parts into an attaching machine for snap fasteners and the like.

2. Description of Related Art including Information Disclosed under §§1.97 to 1.99

The prior art includes U.S. Pat. No. 4,462,517 issued July 31, 1984. In that machine snap fastener parts may be selectively fed into the die of an attaching machine from either of two hoppers. The selecting is done by manual switching means comprising two separate feed tracks which are alternately opened by gates controlable by a manually turnable rotary yoke with fingers which engage the gates on alternate sides of their pivot points to alternately and oppositely open and close them.

SUMMARY OF THE INVENTION

Under the present invention the switching means for interrupting the flow of parts from one of the hoppers and shifting over to the flow from the other hopper is presettable to automatically switch after a desired number of fastener settings. As the switching means a yoke is driven in oscillating fashion by a rotary solenoid to open the gates alternately and oppositely so that the tips alternately open and close the two tracks. A settable counter is provided to count strokes of the pusher which moves a part from one of the tracks to the dies of the setting machine, and a circuit is provided to oscillate the yoke when the number of strokes reaches the setting.

BRIEF DESCRIPTION OF THE DRAWINGS

Further objects and features of the invention will be apparent from the following specification and the drawings, all of which disclose a non-limiting embodiment of the invention. In the drawings:

FIG. 1 is a front sectional view along line 1—1 of FIG. 3 of an assembly embodying the invention shown with the upper track closed and the lower track opened.

FIG. 2 is similar to FIG. 1 but showing the gates in their alternate position;

FIG. 3 is a right side elevational view;

FIG. 4 is a partly schematic and simplified view of a feed for an attaching machine incorporating the invention;

FIG. 5 is a fragmentary sectional view taken on the line 5—5 of FIG. 4 but adding parts not shown in FIG. 4;

FIG. 6 is a front view of the counter panel as used with the invention; and

DESCRIPTION OF THE PREFERRED EMBODIMENT

Figure 7:
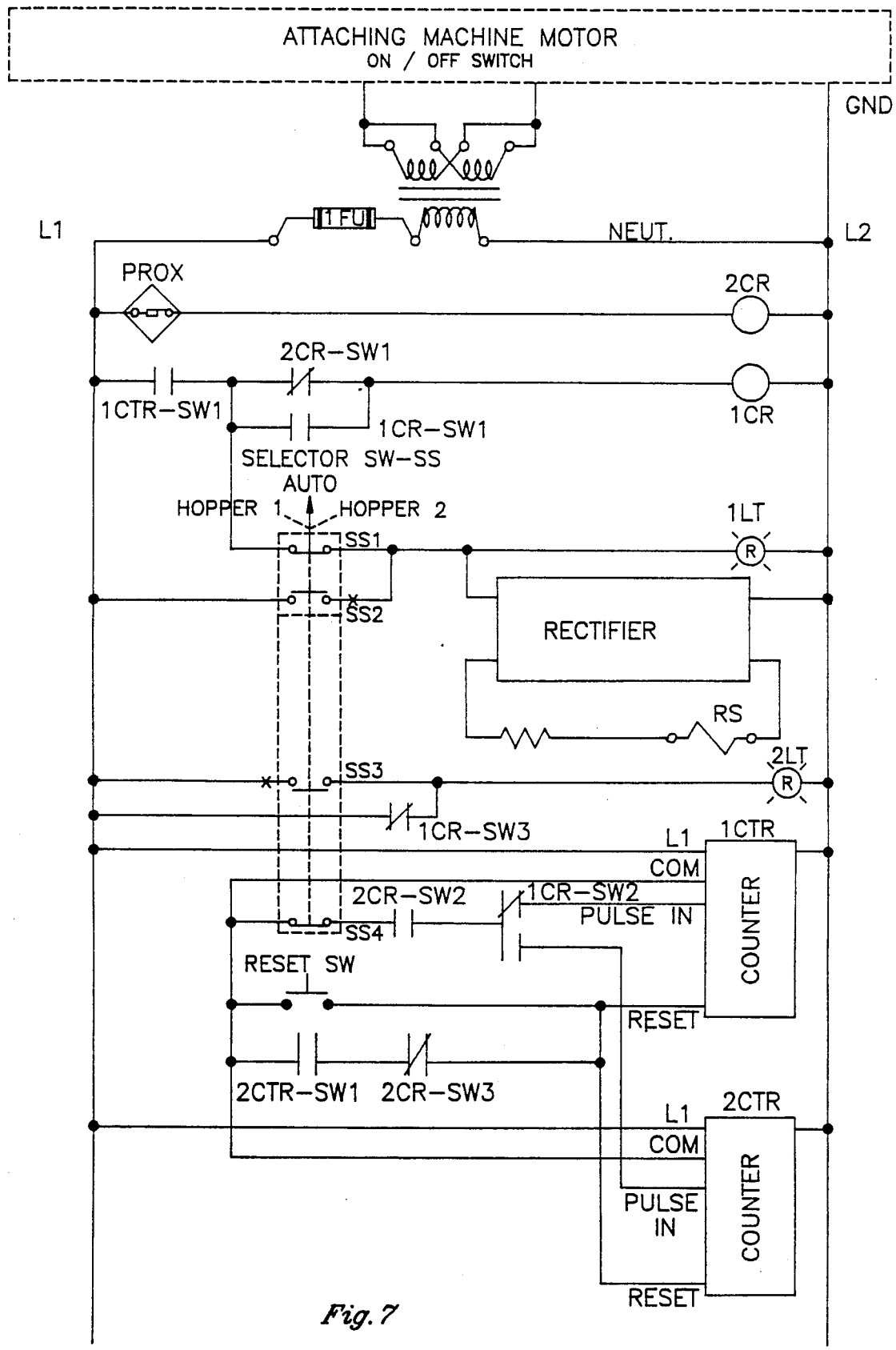
FIG. 7 is a schematic diagram of the circuitry of the feeder.

An assembly embodying the invention is generally designated 10 in FIG. 1. It comprises a pair of tracks 12 and 14 for feeding, as shown, lines of diverse fastener parts or the like. The tracks are superposed; that is, disposed one above the other. The arrangement is generally as shown in U.S. Pat. No. 4,462,517 which issued July 31, 1984.

In the illustration shown the upper of the two tracks, track 12, is shown feeding snap fastener studs while the lower of the two tracks is shown feeding snap fastener sockets. The two tracks may be made from a single extrusion as shown in FIG. 3 or may be multiple parts fastened together. The outlets from different hoppers communicate to the upper ends 16 and 18 of the respective tracks by lead tracks, not shown. Similarly, the lower ends 20, 22 of the respective tracks are connected to slides or pushers which deliver the parts respectively to the upper or lower dies of the setting machine.

As shown best in FIG. 3, both the upper and the lower tracks 12 and 14 have slots 24 and 26 in their respective top and bottom walls.

Disposed in the slot 24 of the upper track 12 is an upper track gate 28 which is mounted intermediate its ends in pivotal fashion on a pivot pin 30. The pin may be fixedly secured across the upper wall of track 12. The portion of the gate 28 above the pin 30 is deflected outward as at 32. Downwardly turned tip 34 extends into the opening of the track 12 and, as shown, when the gate 28 is down, blocks downward movement of the row of parts 36. Alternately, when the gate is in its upper position (FIG. 2) the tip 34 clears the row of parts 36 and permits them to move downward along the track as needed.

Lower track gate element 40 is disposed in the slot 26 in the lower wall of the lower track 14. The gate 40 is pivotally mounted on the pin 42 which is secured across the lower wall of track 14. The gate 40 in its upper portion is deflected outward from the track 14 as at 44. An inward tip 46, preferably in the form of a stud, is adapted to extend through the openings in the parts 48 to block their advancement, and is formed on the lower end of gate 40.

A drive yoke 50 is provided adjacent to the two tracks as shown best in FIG. 3. The yoke 50 preferably has an axis intermediate pins 30, 42 and carries two drive fingers 52 and 54 which are disposed on opposite sides of the tracks and gates as shown. The fingers 52 and 54 may be equidistant from the yoke axis. The axis of rotation of the yoke 50 is the shaft of a fixedly mounted drive motor 56 which may be a rotary solenoid. The yoke 50 is thus fixedly mounted on the shaft of the drive motor 56 and is adapted to oscillate therewith.

Further with regard to the solenoid, it may be of the rotary type in which one stroke is driven by the solenoid armature and the opposite stroke is driven by a return spring. A suitable unit is available from Lucas Ledex Inc. of Vandalia, Ohio and designated model H-3126033. It has approximately 45° of travel.

In operation, as the yoke 50 is oscillated by the motor 56, the fingers 52 and 54 travel in an arc about the axis of the yoke 50, as described. On one "stroke" of the motor 56 the yoke turns in a clockwise direction about its axis so that the fingers 52, 54 strike the lower portion of gate 28 and the upper portion 44 of gate 40 as shown in FIG. 1. This, of course, closes the upper track as the tip 34 intercepts the flow of parts 36. Tip 46 on the gate 40 of the lower track moves downward as shown permitting the parts in the lower track 14 to flow as needed.

On the alternate stroke the yoke 50 rotates counterclockwise so that finger 52 slams against the upper portion 32 of the gate 28 to lift the tip 34 of the upper gate 28 from the upper line of parts 36, permitting them to pass downward. At the same time the other finger 54 slams into the lower part of the gate 40 to cause that part to rise so that stud 46 is inserted into the opening of one of the parts 48 to block movement of those parts along the lower track 18.

The upper and lower walls of the tracks respectively may serve, as they are struck by the fingers, as stop means for the travel of the yoke. Alternatively or simultaneously the stop means may be provided by stops within the solenoid.

The environment of the feeder of the invention is well known in the art. FIG. 4 is a front view of an automatic fastener feeding mechanism forming part of the snap fastener attaching apparatus. The means for holding a garment to be furnished with the snap fasteners. dies (upper and lower) for crimping the snap fastener pieces together, and die drive means for opening and closing the dies are not shown but are all conventional. (Refer to FIG. 5.)

Support frames 60, 62 are integrally secured to the base (not shown) of the snap fastener-attaching apparatus. Between these frames are disposed upper and lower crimping dies and shown in FIG. 5. The frames 60, 62 support L-shaped brackets 64, 66 respectively. The vertically extended portion 68 of the L-shaped bracket 64 is formed with a circular recess 70 defining one end wall of a hollow of the hopper body 72 accommodating, for instance, the backing pieces of the fasteners. Similarly, the vertically extended portion 74 of the L-shaped bracket 66 for the female and male pieces is formed with circular recesses 76, 78 defining one end walls of hollows of the hopper bodies 80, 82 for female and male pieces of the fasteners (e.g., the hopper body 80 being for holding the male pieces and the hopper body, 82 for the female pieces).

Because the three hoppers are analogous in many details of the circular recess and vertical portion, the common parts will be described below only in connection with the hopper body 82 and its associated parts. The vertical wall portion 74 of the L-shaped bracket 66 has a center opening through which a shaft 84 extends horizontally and is supported for rotation by bearings 86. In the hopper body 72, too, a shaft 88 is rotatably supported. The hopper body 82 is fitted on the shaft and is secured in place by setscrews (not shown). The other hopper bodies 72, 80 are likewise mounted.

Part of the hopper 82 is cut off to provide a sectoral opening, in which a cover 90 is shown detachably fitted by a pin and a screw. This cover 90 is removed when the female pieces of snap fasteners are to be replenished or discharged from the hopper. The hopper bodies 72, 80, too, may have similar covers. Also, all of the hoppers may be equipped with the means 92, 90 of the same structure for supplying the female, male, or backing pieces of the snap fasteners.

On the inner end portions of the shafts 84, 88 are fixedly mounted one-way clutches 98, 100, which in turn are connected to prime movers (not shown) through crank rods 102, 104 so as to drive the rotary hopper bodies intermittently in the same direction as indicated in FIG. 1. Each rotary hopper body is in the form of a truncated cone and is formed with directional control grooves 106 on the flat periphery facing the circular recess 78. The geometry of the directional control grooves depends on the type of female, male, or backing pieces of the snap fasteners to be handled, all as are well known in the art.

To the vertical portions 68, 74 of the L-shaped brackets 64, 66 are fixed guide plates 106, 108, 110 and track connectors 112, 114, 116. The brackets are formed with grooves connected with the lower ends of the track connectors 112, 114, 116, and tracks 118, 120, 122 are fitted into these grooves. The tracks, in turn, are fixed to the vertical portions of the L-shaped brackets by setscrews 124, 126, 128. Each track is T-shaped in cross section similarly to the T-groove of the corresponding connector 112, 114, 116. The design of the T-groove of each track is dictated by the size and shape of the female, male, or backing pieces of the snap fasteners to be handled. The tracks 118, 120, 122 are all bent midway, extending toward the location where the fastener components are engaged by a pusher to be described.

In order to deliver the snap fasteners from the discharge outlets of the tracks 118, 120, 122 to the fastener-attaching point X, or into the space between the upper and lower dies of the attaching machine, a pusher unit is employed. FIG. 5 diagrammatically illustrates such a unit. The discharge outlets of the tracks 118, 120, 122 are open, respectively, in guide grooves 124, 126 of fastener guides 128, 130 attached to the housing 132. In the guide grooves 124, 126 are slidable fitted pusher bars 134, 136, both secured to a slide block 138. A proximity switch PROX is fixed adjacent the rear travel limit of block 138. The block 138 has openings through which guide rods 140, 142, supported at one end by a bracket 144 secured to the housing 132 (and likewise supported at the other end (not shown) extend so that the block 138 can slide over the rods 140, 142. The front ends of the fastener guides 128, 130 are open at the fastener-attaching point X and, as the slide block 138 is driven in the direction of the arrow by a prime mover (not shown), the pusher rods 134, 136 move the fastener part from the track 120, 122 and 118 to the attaching point.

The housing 132 is provided with an upper die consisting of the working end of a plunger 146 and a holder 148 which can resiliently hold sequentially each fastener part and is mounted on the plunger 146. The housing also securely supports a lower die which consists of a holder 150 likewise capable of resiliently holding a part and being biased upward with a spring 152 and journaled to reciprocate slightly on a stationary rod.

CONTROL CIRCUIT

A diagram of the control circuit including the solenoid, the proximity switch and the counters is presented in FIG. 7. As it shows, at the top of FIG. 7 power in parallel with the continuously running attaching machine motor is connected to the control circuit. The power is delivered to the circuit through a transformer T1, the secondary of which, as shown, is connected ground L2 and to a live wire L1 through a fuse 1FU. On the next downward line of FIG. 7 the proximity switch PROX is connected in series with a coil relay 2CR across L1 and L2.

On the next downward line a switch 1CTR-SW1 operated by the first counter 1CTR is connected in series with a normally closed switch 2CR-SW1 operated by coil relay 2CR and a second coil relay 1CR, all across L1 and L2. Coil relay switch 2CR-SW1 is connected in parallel with a normally open switch 1CR-SW1 driven by coil relay 1CR.

A connection is made as shown between the switch 1CTR-SW1 and the normally closed switch 2CR-SW1 and the power input to the rectifier. The other power terminal of the rectifier is connected to the ground L2 as shown. The output of the rectifier is connected across the rotary solenoid RS with appropriate resistance so that when the rectifier is activated, as discussed below, the rotary solenoid 56 will drive the yoke 50 to its second position (FIG. 2) connecting the alternate source of parts.

As shown at the lower end of FIG. 7, the first counter 1CTR which counts parts as they pass through the feed assembly from the primary source of parts (FIG. 1), is powered by being connected across L1 and L2. Similarly shown below 1CTR the second counter 2CTR which counts parts from the alternate source is powered by lines connecting L1 and L2.

A further switch marked 2CR-SW2 is connected between a line common to both counters 1CTR and 2CTR to a relay contact 1CR-SW2 activated by the coil relay 1CR and connected respectively to the "pulse in" terminal of the two counters 1CTR and 2CTR.

The reset connection from both counters 1CTR and 2CTR is connected to the common line bridging between the two counters through a reset switch which is manually operable in the console of the setting machine. Also, the two reset connections are connected to the common line between the two counters 1CTR and 2CTR through two contacts in series, one 2CTR-SW1 activated by the counter 2CTR itself and the other 2CR-SW3 normally closed and activated by the first coil relay 2CR.

For a "repair" function a three-way selector switch SS may be provided. In one form this is a three-position switch available from Microswitch and having the following components: Operator PTSE-H2-01; knob PTSZ02; contact block PTCD; and contact block PTCG. There are three separate pairs of contacts designated on the drawing as SS1, SS2 and SS3, the contacts for SS4 as shown are the same as those for SS1.

The purpose of the "repair" switch SS is to permit the operator, without affecting the count, to go back and redo a fastener attachment with parts from a selected one of the hoppers.

OPERATION

Having thus described the circuit, its operation will now be set forth. As the setting machine is activated by a master control switch (not shown) so is the above described circuitry. Thus, power is impressed across the two lines L2 and L1.

With the feeder in FIG. 1 condition, for instance, and the counter 1-CTR set to the desired number of fastener sets, the proximity switch as shown in FIG. 5 is momentarily closed for each stroke of the pusher or rotation of the crank (as described) herein as a "pulse". Thus at each stroke of the pusher, the first coil relay 2CR is pulsed once. This, in turn, momentarily opens the switch 2CR-SW1, closes switch 2CR-SW2 and opens switch 2CR-SW3 to register the pulses through the closed contact of switch 1CR-SW2 into the counter 1CTR.

When the counter 1CTR registers its set amount, say for the setting of five sockets from the primary supply, as evidenced by five reciprocations of the pusher, detected by the proximity switch, the counter 1CTR will close the switch 1CTR-SW1. This closing will cause an activation of the rectifier R and solenoid RS(or 56 in FIG. 2) to instantaneously flip the yoke 50. Also activated is the relay coil 1CR as the proximity switch PROX pulses relay 2CR and switch 2CR-SW1. Once the relay 1CR is pulsed, switch 1CR-SW1 is closed to keep relay 1CR on. Because the rectifier is now continuously energized so is the solenoid RS and the yoke 50 maintains the position of FIG. 2.

Subsequently, when the second counter 2CTR registers its set limit, say seven snap fasteners, it will close the switch 2CTR-SW1 and because the switch 2CR-SW3 is closed, that will automatically reset both counters 1CTR and 2CTR, opening the switch 1CTR to turn off the rectifier. As a result, the rotary solenoid will be deactivated and the counter spring within the solenoid RS will return the yoke 50 to its first position (FIG. 1) ready for the next sequence of operation for which both counters will still be set at the original settings.

The settable counters in an actual installation are Model H7CN digital counters made or sold by Omron Tateisi Electronics Co. As shown in FIG. 6, each of the counters 1CTR and 2CTR has set figure windows and dials 160, 162 and LED register windows 164, 166.

The 3-position double throw switch SS is placed in the "auto" position. Proximity Switch PROX closes as the machine is cycled and 2CR is energized. This opens contacts 2CR-SW1 and 2CR-SW3 and closes contact 2CR-SW2 which registers a count on 1 CTR through contact 1CR-SW2. This process continues each time the machine is cycled.

When 1 CTR reaches its programmed count, contact 1CTR-SW1 closes which energizes 1CR. With 1CR activated, contacts 1CR-SW1 and 1CR-SW2 (lower contacts as shown) close and contacts 1CR-SW3 and 1CR-SW2 (upper half) open. This action turns light 2LT off and light 1LT on. The rectifier and solenoid RS are also activated. With the device in this condition, each time the machine is cycled, a count will be registered on 2CTR. When 2CTR reaches its programmed count, 2CTR-SW1 is closed and both counter registers are automatically reset to zero. By resetting the system, 1CTR-SW1 and 1CR are opened and the solenoid RS is deactivated. The manual pushbutton RESET SW could also be used at any time during the sequence to reset the system.

"REPAIR" SELECTOR SWITCH OPERATION

The selector switch SS is set to the "Hopper 1" position. This will allow only parts from "Hopper 1" (FIG. 1) to be fed without changing any of the counter register values on 1CTR or 2CTR. By moving the selector SS to the "Hopper 1" position, contacts SS1 and SS4 are opened and contact SS3 is closed. Light 2LT is on, the solenoid is deactivated, and only parts from "Hopper 1" will be fed.

If the selector switch SS is set to the "Hopper 2" position, contacts SS1 and SS4 are opened and contact SS2 is closed. By closing contact SS2, 1LT is on, the rectifier and solenoid RS are activated, and only parts from "Hopper 2" are fed (FIG. 2). By opening contact SS4 none of the counter values are changed, and when switch SS is returned to "Auto", the count sequence will resume counting in normal fashion.

It should be clear that the arrangement described is a convenient and efficient means for switching the flow of parts from one track to another and back automatically based on preset numbers of attachments. The "repair" feature makes the machine more flexible.

While the invention has been disclosed in a single embodiment, it is not so limited but is susceptible of many variations and modifications, all within the scope of the following claim language or reasonable equivalents thereof.

What is claimed is:

1. A selective feed assembly for diverse small parts comprising:
   (a) a pair of closely spaced parallel superposed inclined tracks structured to receive lines of the diverse small parts respectively,
   (b) an oscillatable drive yoke having a fixed central yoke axis inbetween the tracks and having fingers parallel to and on opposite sides of the yoke axis,
   (c) a pair of gate elements each having lower and upper ends disposed along and above and below the tracks respectively and mounted to pivot intermediate their ends on parallel gate element axes above and below the tracks respectively, and within the arcs defined by the travel of the fingers on the yoke, the gate elements each having inward blocking tips at their lower ends and adapted to move into and out of the respective lines as the gate elements pivot,
   (d) power means for the drive yoke adapted to oscillate the yoke to alternate positions so that the fingers strike the gates on opposite sides of their pivot axes and so that the tips oppositely and alternately block and unblock the lines of parts on the respective tracks as the yoke oscilates,
   (e) reciprocable pusher means for moving the small parts from the lower end of the tracks to a worksite,
   (f) drive means for the pusher,
   (g) sensor means for sensing each reciprocation,
   (h) settable counter means for counting the number reciprocations, and
   (i) circuit means connecting the sensor means, the settable counter means and the power means and a current supply whereby the sensor means advances the setable counter means for each reciprocation of the pusher means and after the counter means registers the set number of reciprocations, the circuit means activates the power means to shift the drive yoke from its first position to its next position.

2. A selective feed assembly as claimed in claim 1 further including a second settable counter and the circuit means also connects the second settable counter whereby the sensor means advances the second settable counter means for each reciprocation of the pusher means with the yoke in said next position and after the second counter means registers the set number of reciprocations, the circuit means activates the power means to shift the drive yoke back to its first position.

3. A selective feed assembly as claimed in claim 1 wherein the drive means is a rotary solenoid.

4. A selective feed assembly for delivering diverse small parts to the die of a fastener attaching machine comprising:
   (a) a pair of inclined tracks structured to receive lines of the diverse small parts respectively,
   (b) a pair of gate elements for the tracks respectively, the gate elements being linked to operate oppositely and alternately from a first condition to a second condition,
   (c) power means for driving the gate elements,
   (d) reciprocable pusher means for moving the small parts from the lower end of the tracks to a die,
   (e) drive means for the pusher,
   (f) sensor means for sensing each reciprocation,
   (g) settable counter means for counting the number reciprocations, and
   (h) circuit means connecting the sensor means, the settable counter means and the power means to shift the gate elements from their first condition to a second condition when the settable counter means senses the set number from the sensor means.

5. A selective feed assembly as claimed in claim 4 including additionally in the circuit, repair means for interrupting the sequence of operations to perform additional attaching steps with the solenoid selectively activated or deactivated and then resuming the sequence without disturbing the count or condition of the solenoid in the sequence.

6. A selective feed assembly as claimed in claim 5 wherein the repair means includes a three-position selector switch, one position being for the preset sequence of operations and the other two positions being respectively to operation with the solenoid either energized on deenergized.

* * * * *